June 9, 1925.

G. S. HANFORD 1,541,137

IMPULSE COUPLING FOR MAGNETOS

Filed Dec. 11, 1920

2 Sheets-Sheet 1

INVENTOR
George S. Hanford
BY Ray S. Fehr
ATTORNEY

June 9, 1925.

G. S. HANFORD 1,541,137

IMPULSE COUPLING FOR MAGNETOS

Filed Dec. 11, 1920

2 Sheets-Sheet 2

INVENTOR
George S. Hanford
BY Ray S. Fehr
ATTORNEY

Patented June 9, 1925.

1,541,137

UNITED STATES PATENT OFFICE.

GEORGE S. HANFORD, OF LAKEWOOD, OHIO, ASSIGNOR TO THE TEAGLE COMPANY, OF CLEVELAND, OHIO, A CORPORATION OF OHIO.

IMPULSE COUPLING FOR MAGNETOS.

Application filed December 11, 1920. Serial No. 430,039.

*To all whom it may concern:*

Be it known that I, GEORGE S. HANFORD, a citizen of the United States, residing at Lakewood, in the county of Cuyahoga and State of Ohio, have invented certain new and useful Improvements in and Relating to Impulse Couplings for Magnetos, of which the following is a specification, reference being had therein to the accompanying drawing.

This invention relates to that class of driving mechanisms for ignition generators of internal combustion engines commonly known as impulse couplings or impulse starters. A mechanism of this sort usually comprises a driven member fast on the rotor shaft of the generator, a driving member rotatable relative to the driven member, a driving spring interposed between the driving and driven members and means for intermittently retarding rotation of the driven member relative to the driving member so as to give the rotor of the generator a rapid movement intermittently when the driving member is turned slowly during the starting of the engine.

In the use of these impulse couplings the inertia of the driven member and the generator rotor, when suddenly snapped forward by the driving spring, causes a shock which has been somewhat troublesome; and the main object of the present invention is to provide an impulse coupling having a new and improved driving spring and method of mounting the same adapted to utilize the resiliency of the driving spring itself to absorb the shock above referred to.

A further object of the invention is to provide an impulse coupling which is readily adapted to be driven in either direction.

Stated more specifically, it is an object of the invention to utilize for the purposes above mentioned the spiral or clock type of spring, which is readily produced and affords ample capacity within compact space.

Another object of the invention is to provide an impulse coupling which is thrown into and out of operation automatically by speed control devices and which can readily be thrown out of operation entirely when desired.

The foregoing objects and others more or less ancillary to them as well as the manner in which said objects are attained will be fully understood from the following description in connection with the accompanying drawings which show a preferred form of construction.

Figure 1:
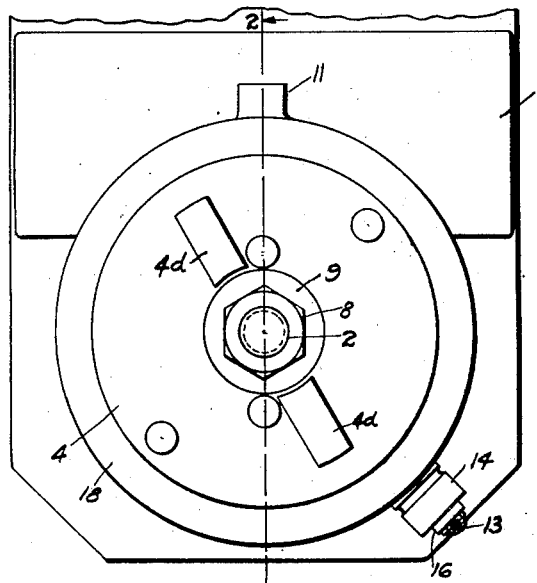

In the drawings, Figure 1 is an end elevation of the lower part of an ignition current generator with my improved impulse coupling applied thereto.

Figure 2:
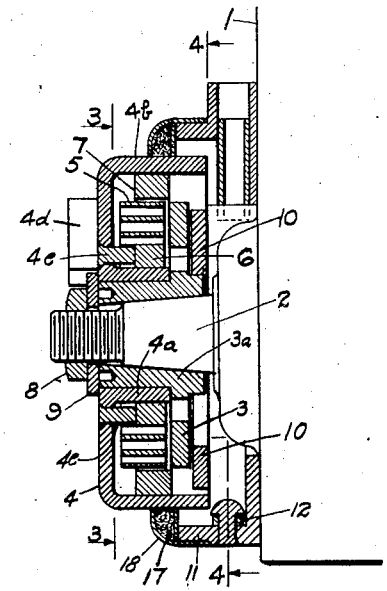
Figure 3:
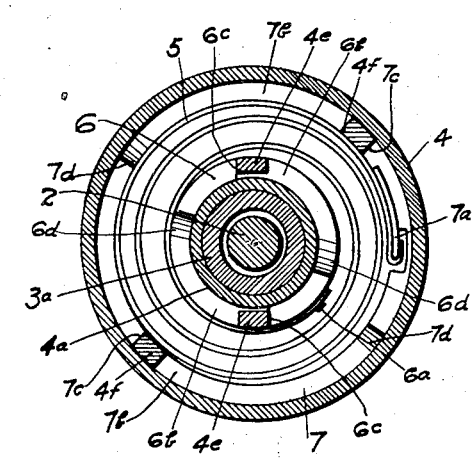
Figure 4:
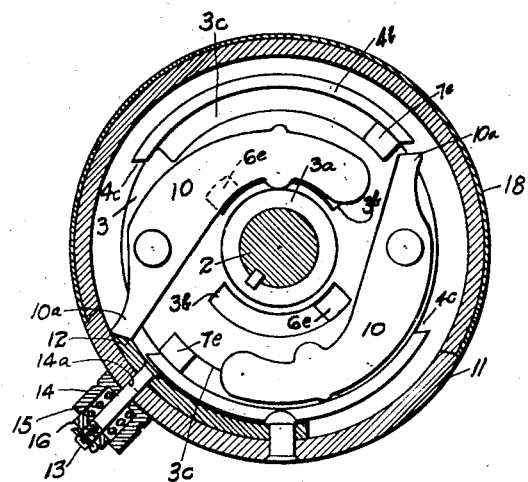
Figure 5:
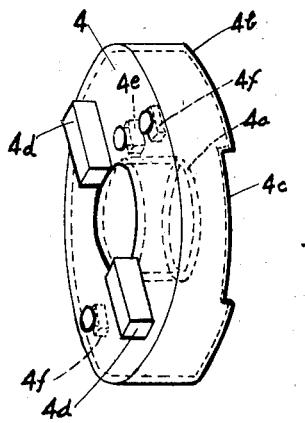
Figure 6:
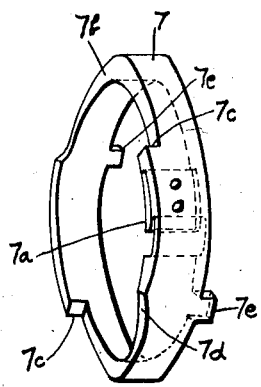
Figure 7:
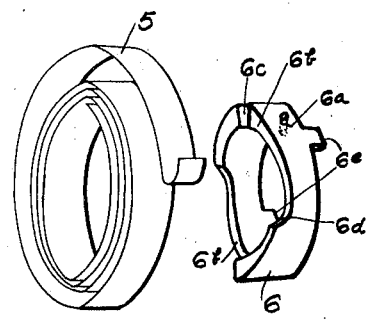
Figure 8:
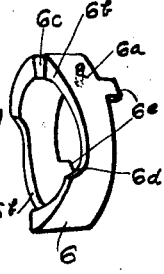
Figure 9:
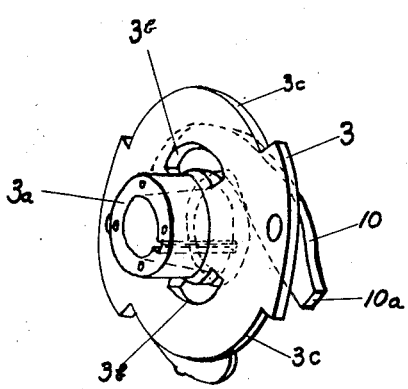
Figure 10:
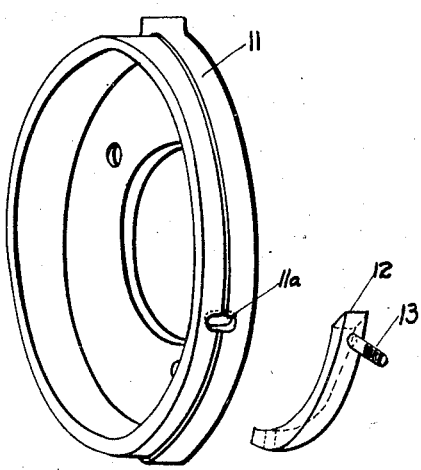
Figure 11:
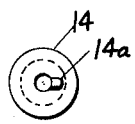

Fig. 2 is a section on the line 2—2, Fig. 1.
Fig. 3 is a section on the line 3—3, Fig. 2.
Fig. 4 is a section on the line 4—4, Fig. 2.
Figs. 5, 6, 7, 8, 9 and 10 are detached perspective views of parts of the coupling.
Fig. 11 is an inner end view of a combined washer and catch device for securing the automatic pawl mechanism in or out of operative relation.

Referring in detail to the construction illustrated, 1 designates the end wall or plate of the generator and 2 is the driving end of the rotor shaft of said generator. 3 designates the disc-like driven member of the coupling which has a hub $3^a$ keyed on the tapered end of the shaft 2. The disc of the driven member 3 is formed adjacent the hub with two diametrically opposite arcuate slots $3^b$ and with two diametrically opposite peripheral notches $3^c$.

4 is the disc-like driving member of the coupling and it is formed with a hub $4^a$ that is rotatably mounted on the hub $3^a$ of the driven member. At its periphery, the driving member is formed with a flange $4^b$ having in its edge diametrically opposite notches $4^c$. On its outer face, the driving member is formed with the usual driving lugs $4^d$. The driving member has on its inner face a pair of diametrically opposite lugs $4^e$ disposed near its hub and also a pair of diametrically opposite lugs $4^f$ disposed near its peripheral flange.

Between the disc-like driven and driving members 3 and 4 is arranged a driving spring 5 of the spiral or clock type. This spring has its inner end secured to a connector 6 by means of an aperture in the spring which passes over a pin $6^a$ of said connector. The connector 6 is a ring-like body rotatably mounted on the hub $4^a$ of the driving member and formed on its outer side with two diametrically opposite notches or recesses $6^b$ which terminate at one of their ends with square shoulders $6^c$ and at the opposite end with curved or cam surfaces $6^d$. The lugs $4^e$ of the driving member are disposed to move in the notches 6$^b$ and to engage the shoulders 6$^c$ and cam surfaces 6$^d$. On its other side, the connector 6 is formed with a pair of diametrically opposite lugs 6$^e$ which project into the arcuate slots 3$^b$ of the driven member 3.

The outer end of spring 5 is secured to a ring-like connector 7, the end of the spring being hooked to engage a clip 7$^a$ on the interior of the said connector. The outer side of the connector 7 is formed with diametrically opposite notches 7$^b$ which terminate at one of their ends with square shoulders 7$^c$ and at their other ends with rounded or cam surfaces 7$^d$. The connector 7 is rotatably supported on the inner wall of the flange 4$^b$ of the driving member and is disposed so that the lugs 4$^f$ of the driving member are disposed to move in the notches 7$^b$ and engage the shoulders 7$^c$ and cam surfaces 7$^d$. It will be noted that the shoulders 7$^c$ face in the opposite direction to the shoulder 6$^c$. On its rear side the connector 7 is formed with a pair of diametrically opposite lugs 7$^e$ which are disposed to move in the peripheral notches 3$^c$ of the driven member and engage the end walls of said notches.

The driving member 4 is secured in operative position by a nut 8 and washer 9.

The following automatic devices are provided for intermittently temporarily arresting the movement of the driven member. On the back of said driven member 3 are pivoted a pair of diametrically opposite dogs 10, each of which has its shorter and lighter end formed with a nose 10$^a$ adapted to project radially outward through one of the notches 4$^c$ of the driving member while its longer and heavier end is adapted when the speed of the generator rises to a certain point to fly outward and retract the nose 10$^a$ of the dog so that it no longer projects beyond the periphery of the driving member. 11 is an annular frame and casing member rigidly secured to the end plate 1 of the generator and provided on its inner cylindrical surface with a movably mounted stop lug 12. As shown, this lug is pivotally secured at its lower end to the casing 11 while its upper end carries a threaded pin 13 that projects through a slot 11$^a$ of the said casing. On the pin 13 is arranged a cup shaped washer 14 having a lug 14$^a$ on its inner face which is adapted to project into the slot 11$^a$ at one side or the other of the pin 13. The washer 14 is pressed against the casing 11 by a spring 15 which is secured on the pin by a nut 16. By retracting the washer 14 and turning it 180°, its lug 14$^a$ can be shifted from one side of the pin 13 to the other so that the stop lug 12 can be set either in or out of the path of the centrifugal dogs 10.

The driving member 4 projects into the casing member 11 and the opening between them is closed dust-tight by means of a felt washer 17 which is secured in position by an annular cap 18.

In assembling the mechanism, the spring with the two connector rings 6 and 7 attached thereto is placed in position on the driving member 4. The driving member is then placed in working position on the hub of the driven member with the lugs 6$^e$ and 7$^e$ of the connectors in the slots 3$^b$ and notches 3$^c$, respectively, of the driven member. The driving member is then turned to wind the spring and give it the desired amount of initial tension. To do this the driven member is held against turning, as by applying a spanner to the end of the hub 3$^a$, and then, when the driving member is turned in one direction or the other, its lugs 4$^e$ or 4$^f$ ride up over the cams 6$^d$ or 7$^d$, as the case may be, and the driving member and one of the connectors are forced outward to permit the relative turning of the driving and driven parts to continue until the desired spring tension is secured, whereupon the driving member is pressed in again to normal position with the lugs of both connectors again operatively engaging the driven member. The parts are then secured by nut 8.

As shown in the drawings, the coupling is constructed and assembled for clockwise rotation of the generator and it will be seen that with the ends of the driving spring 5 connected to the driving and driven members through rings 6 and 7, the driven member can be held against rotation and the driving member turned clockwise against the tension of the spring as far as the notches 3$^c$ will permit the ring 7 to turn or, if the driving member is held against rotation, the driven member can be turned in the opposite direction as far as the slots 3$^b$ will permit the ring 6 to turn. In other words, either end of the spring can be held stationary and the other turned with the connections which are provided for said spring.

In the operation of the mechanism, assuming that the stop lug 12 is in working position, as the driving member is turned slowly on starting the engine, the pivoted dogs 10 are held by gravity in position to engage the stop 12. Thus the driven member is held against rotation while the rotation of the driving member continues with a consequent increase in the tension of the driving spring 5. This relative rotation of the driving and driven members continues until the end of the notch 4$^c$ in the flange of the driving member strikes the projecting end of the dog and disengages the latter from the stop 12, whereupon the driven member 3 is permitted to snap forward under the impulse imparted by the driving spring 5. During the forward movement of the driving member relative to the driven member, the connector ring 6 has its lugs 6ᵉ pressed by the driving spring against the forward ends of the slots 3ᵇ in the driven member and the ring 6 as well as the driven member is held against rotation. Meanwhile, the driving member with its lugs 4ᶠ engaging the shoulders 7ᶜ of the ring 7 causes the latter to turn with the driving member, the lug 7ᵉ meanwhile advancing in the peripheral notches 3ᶜ of the driven member while the lugs 4ᵉ of the driving member advance away from the square shoulders 6ᶜ of the connector ring 6. Thus, when the driven member is released and snapped forward by the spring, a relative movement of the driving and driven members in the reverse direction takes place at the end of which the rear end walls of the notches 3ᶜ overtake and engage the lugs 7ᵉ of the connector ring 7 while the square shoulders 6ᶜ of the connector ring 6 overtake and engage the lugs 4ᵉ of the driving member. The inertia of the driven member and the rotor of the generator as a result of their quick forward movement under the impulse of the spring is large and would result in severe shock if the movement were suddenly arrested. With this mechanism, however, continued movement of the driven member and rotor past the point of equilibrium is permitted. During this continued movement, the ring 6, being held against turning more rapidly than the driving member, affords an abutment for the inner end of the spring 5, while the outer ring 7, being free to advance more rapidly than the driving member, is carried forward by engagement of the rear wall of the notches 3ᶜ of the driven member with the lug 7ᵉ, meanwhile further compressing the spring 5. The spring is thus caused to absorb the shock which would otherwise result from the rapid forward movement of the driven member and rotor.

With two of the centrifugal dogs 10, it is clear that the mechanism provides for an impulse every half revolution and, if the engine does not start on the first impulse, the rotor will be given successive rapid impulses until the explosive charges are ignited and the engine starts under its own power. As soon as this occurs, the increased speed causes the centrifugal force to move the dogs 10 to operative position whereupon the rotation of the generator rotor is uniform with that of the driving member of the coupling.

If it is desired at any time to drive the generator without the impulse connection at starting, this can be accomplished by simply shifting the stop lug 12 to inoperative position. Also, it is convenient to throw the impulse mechanism out of operation in this manner when timing the valves of the engine.

It will be seen that my improved spring mechanism, in addition to providing means of absorbing the shock incident to the impulse connection, is adapted to be driven in either direction. That is to say, it is only necessary to reverse the mounting of the dogs 10 on the driven member 3 and of the stop lug 12 on the frame 11 to adapt the mechanism illustrated for operation in a counterclockwise direction.

It will be understood that the form of construction shown and described is presented for purposes of explanation and illustration, the scope of the invention being indicated by the following claims.

What I claim is:

1. In an impulse drive coupling for ignition generators, the combination of a rotary driven member, a rotary driving member coaxial with the driven member, a resilient driving and cushioning means between the driving and driven members comprising a spiral spring, a connector secured to the inner end of the spring and having a rotational lost-motion connection with the driving and driven members and a connector secured to the outer end of said spring and having a rotational lost-motion connection with the driving and driven members, and means for temporarily retarding the rotation of the driven member in relation to the rotation of the driving member.

2. In an impulse drive coupling for ignition generators, the combination of a rotary disc-like driven member, a rotary disc-like driving member coaxial with the driven member, a resilient driving and cushioning connection between said members comprising a spiral spring disposed between the discs of the driving and driven members and having at its inner end rotational lost-motion connections with both of said discs and at its outer end similar connections with both of said discs, and means for temporarily retarding the rotation of the driven member in relation to the rotation of the driving member.

3. In an impulse drive coupling for ignition generators, the combination of a rotary disc-like driven member formed with a projecting hub, a rotary disc-like driving member having a hub rotatably mounted on the hub of the driven member and formed with a peripheral cylindrical flange, a spiral driving and cushioning spring disposed between the discs of said driving and driven members, means operatively connecting the spring to the driving and driven members comprising a ring secured to the inner end of the spring, rotatably mounted on the hub of the driving member and having a rotational lost-motion connection with the driving and driven members and a ring secured to the outer end of the spring, rotatably mounted in the flange of the driving member and having rotational lost-motion connection with the driving and driven members, and means for temporarily retarding the rotation of the driven member in relation to the rotation of the driving member.

4. In an impulse drive coupling for ignition generators, the combination of a rotary disc-like driving member, a rotary disc-like driven member coaxial with the driving member, a spiral driving and cushioning spring arranged between the discs of the driving and driven members, operative connections between the spring and the driving and driven members comprising two rings coaxial with the driving and driven members, said rings being disposed between the driving and driven members and rotatably mounted on one of them and each of said rings having rotational lost-motion connection with the driving and driven members, and means for temporarily retarding the rotation of the driven member in relation to the rotation of the driving member.

5. In an impulse drive coupling for ignition generators, the combination of rotating driving and driven members, a driving connection between said members including a spring, means for intermittently temporarily retarding the rotation of the driven member in relation to the driving member comprising a normally stationary stop, a centrifugal member carried by the driven member and adapted to engage the stationary stop when the coupling turns slowly and to move to an inoperative position when the speed of the coupling increases, means carried by the driving member to disengage the centrifugal means from the stationary stop, a casing structure for the coupling enclosing the stationary stop, and means outside said casing for manually moving the stationary stop to an entirely inoperative position.

6. In an impulse drive coupling for ignition generators, the combination of rotating driving and driven members, a driving connection between said members including a spring, means for intermittently temporarily retarding the rotation of the driven member in relation to the driving member comprising a normally stationary stop, a centrifugal member carried by the driven member and adapted to engage the stationary stop when the coupling turns slowly and to move to inoperative position when the speed of the coupling increases, means carried by the driving member to disengage the centrifugal means from the stationary stop, the said stop being manually movable to inoperative position, and means for securing the stop in its operative and inoperative positions.

In testimony whereof, I hereunto affix my signature.

GEORGE S. HANFORD.